United States Patent [19]

Meier et al.

[11] Patent Number: 4,616,326
[45] Date of Patent: Oct. 7, 1986

[54] SELF OPTIMIZING ROBOT CONTROLLER

[75] Inventors: Christof Meier, Heroldsbach; Richard Bartelt; Hans-Joachim Massat, both of Erlangen, all of Fed. Rep. of Germany

[73] Assignee: Siemens Aktiengesellschaft, Berlin and Munich, Fed. Rep. of Germany

[21] Appl. No.: 546,440

[22] Filed: Oct. 28, 1983

[30] Foreign Application Priority Data

Nov. 30, 1982 [DE] Fed. Rep. of Germany ....... 3244307

[51] Int. Cl.⁴ ......................... G09C 1/00; G05B 19/18; G05B 13/00; G06K 9/54
[52] U.S. Cl. ..................................... 364/513; 364/167; 364/169; 364/170; 364/171; 318/561; 382/15; 382/49
[58] Field of Search ............... 364/167, 168, 169, 170, 364/171, 172, 173, 174, 513, 131, 132, 137; 318/561, 568; 382/14, 15, 41, 49, 47; 901/1

[56] References Cited

U.S. PATENT DOCUMENTS

| 3,825,731 | 7/1974 | Kobayashi et al. | 364/169 X |
|---|---|---|---|
| 4,031,369 | 6/1977 | Heaman et al. | 364/169 |
| 4,035,706 | 7/1977 | Cutler | 364/170 X |
| 4,187,454 | 2/1980 | Ito et al. | 364/513 X |
| 4,246,570 | 1/1981 | Kochert et al. | 382/49 X |
| 4,314,329 | 2/1982 | Crewe et al. | 364/167 X |
| 4,403,281 | 9/1983 | Holmes et al. | 364/170 |
| 4,422,150 | 12/1983 | Keller et al. | 364/171 X |
| 4,449,240 | 5/1984 | Yoshida | 382/15 |
| 4,463,297 | 7/1984 | Bennett et al. | 318/561 |
| 4,479,241 | 10/1984 | Buckley | 364/513 X |
| 4,503,507 | 3/1985 | Takeda et al. | 364/131 X |
| 4,550,432 | 10/1985 | Andersson | 364/513 X |

OTHER PUBLICATIONS

Horst Becker et al., "Robot Control M, ein neues Steuerungskonzept für Handhabungssysteme", Siemens-Energietechnik, 1981, No. 819, pp. 285 to 289.
"Application of Mini and Microcomputer," IEEE, 1981, IECI Proceedings, pp. 324–329.

Primary Examiner—Jerry Smith
Assistant Examiner—Jon D. Grossman
Attorney, Agent, or Firm—Kenyon & Kenyon

[57] ABSTRACT

In a robot motion control system a modular sensor data preprocessing unit is provided between the sensors and a motion control unit. Modules in the data preprocessing unit are activated in a temporal sequence in accordance with the kinds of sensors involved and the technological task to be performed. The data preprocessing unit comprises a data transfer control circuit, a basic function control circuit and a complex function control circuit, each such circuit including a plurality of independently activatable function modules. For example, the complex function circuit includes a velocity control module and a path correction module.

16 Claims, 21 Drawing Figures

SELF OPTIMIZING ROBOT CONTROLLER

BACKGROUND OF THE INVENTION

This invention relates to a robot control system having: a sensor interface for receiving signals from sensors, a position controller with interpolation for controlling the motion of the robot along a predetermined path, and a separate data preprocessing unit between the sensor interface and the position controller. Such robot control systems are known in principle from the journal "Siemens-Energietechnik", 1981, no. 8/9, pages 285 to 289.

Until the present time a fixed relationship has existed in general between a sensor signal input and action on the robot system. The action on the system, i.e., the intervention into the control process, may be a path correction with a fixed direction of correction depending on the input, with two binary sensor signals and a three-way switch, or a velocity change in discrete steps or a stopping of the entire motion. An arbitrary combining of data from different interfaces, signal preprocessing and system reaction is generally not available.

The sensor data preprocessing unit should be designed so that the overall system is readily adaptable to different sensors and to different technical tasks, i.e., it should be possible to connect to the robot controller different sensors via different types of data interfaces (binary, analog, serial or parallel) without difficulty and to design the data preprocessing unit such that any selected technological task, such as deburring, welded-seam following, multilayer welded seam following and installation, can be executed.

Accordingly, an object of the present invention is to provide a sensor data prepossessing arrangement which facilitates accommodation of the robot controller to the most varied sensors and the most different technological objectives.

SUMMARY OF THE INVENTION

This object is attained by providing the sensor data preprocessing unit with the following features:

(i) at least one data transfer control circuit, including a plurality of functional modules servicing the sensor interface, for transmitting the sensor data, upon request or cyclically at the interpolation frequency, into an input memory;

(ii) a subordinated basic function control circuit including a plurality of functional modules at least in part for comparing incoming data with each other or with limits, and for storing the results in a binary and/or a variables memory;

(iii) a subordinated complex function control circuit including a plurality of funtional modules addressing the input, the binary and/or the variables memory, the last of which contains preprocessed values for determining velocity corrections and path corrections in at least two mutually independent directions, the complex function control circuit implementing the corrections through proper intervention into the interpolation process in the position controller; and (iv) by the temporally sequential activation of only those modules in the data transfer, the basic function and the complex function control circuits whose functions are required for accomplishing programmed technological tasks.

The complex function control circuit advantageously includes modules for playback, i.e., duplication of a prior motion, and acceleration along a preselected path. The basic function control circuit advantageously comprises modules for the arithmetic treatment of data, the logical interlinkage of data, the nonlinear processing of data, the detection of extreme values and average values, the formation of averages, control functions and sensor coordinate transformations.

The above-described structure of the data preprocessing unit, including a modular system design, enables the reception of incoming sensor signals with synchronous timing and an immediate preprocessing of the sensor signals as well as the implementation of various freely selectable system reactions. In the preprocessing unit according to the present invention it is possible by means of the data transfer control circuit and the basic and complex function control circuits to normalize the data, to perform a zero correction, to perform a limitation and limit-value monitoring and furthermore to filter analog or digital sensor signals. The system reactions can be achieved via the complex-function control circuit. For example in the dynamic correction in two mutually independent directions of the path taken by the robot, the path corrections are executed in response to continuously arriving sensor-dependent correction input data and simultaneously with continuously or discretely executed modifications in travel velocity, whether of the entire robot or of actuator mechanisms such as welding or grinding instruments or riveting or screwing arms. Moreover, a robot motion controller with a data preprocessing unit according to the present invention can recommence and retrace a previously taken path or repeat a previously performed task modified during the first performance in response to sensor data. The principle of the modular control design according to the present invention enables the utilization of any selected combination of data interfaces, data preprocessing functions and ultimate robot responses necessary to an application, thereby accomplishing desired technical tasks such as deburring or welded-seam following.

DETAILED DESCRIPTION OF THE INVENTION

Figure 1:
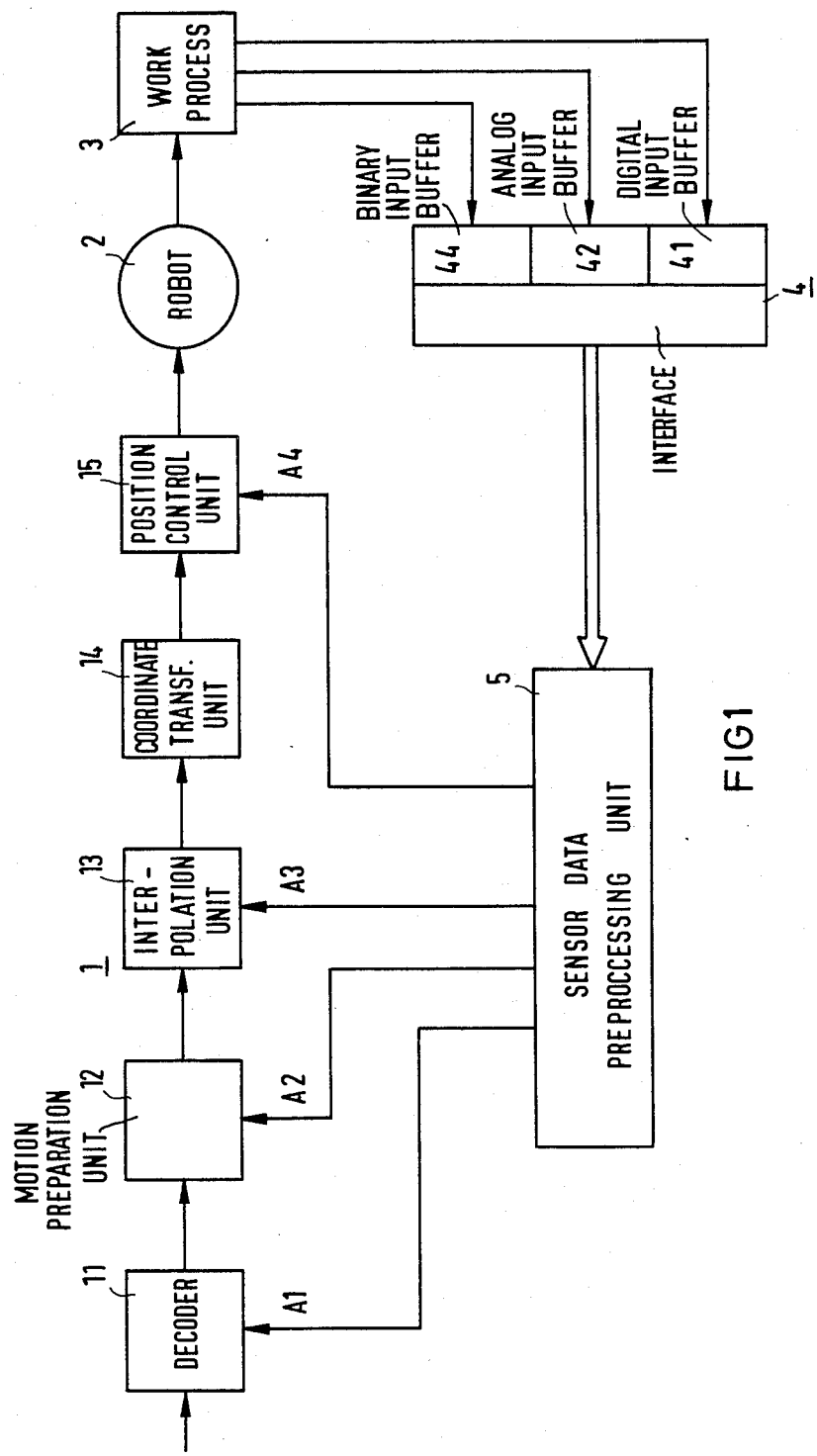
FIG. 1 is a block diagram of a robot control system, showing position control circuitry, a sensor interface and a data preprocessing circuit.
Figure 9:
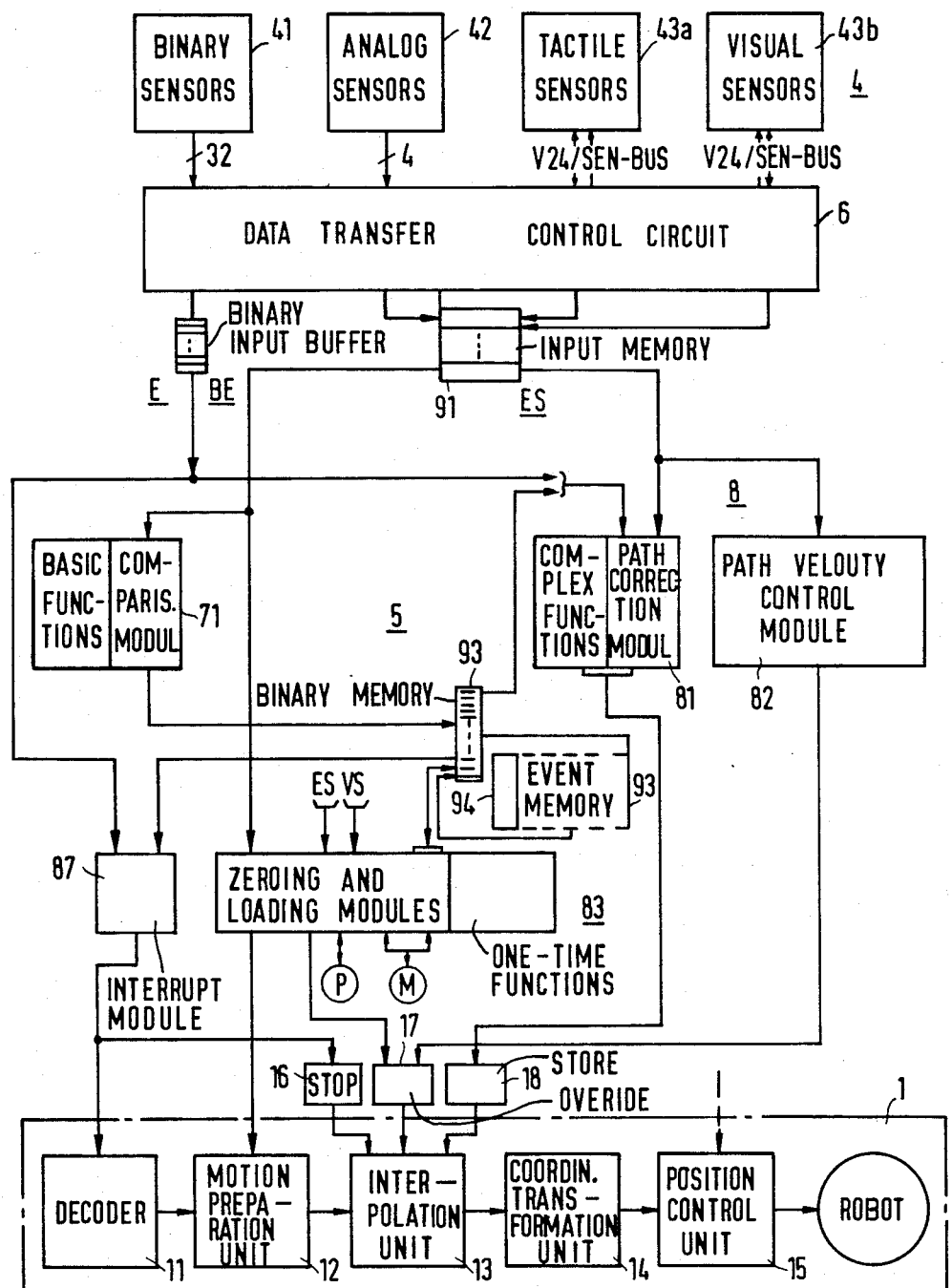
FIG. 9 is a block diagram of an embodiment of the sensor data preprocessing unit of FIG. 1, in accordance with the present invention.
Figure 10:
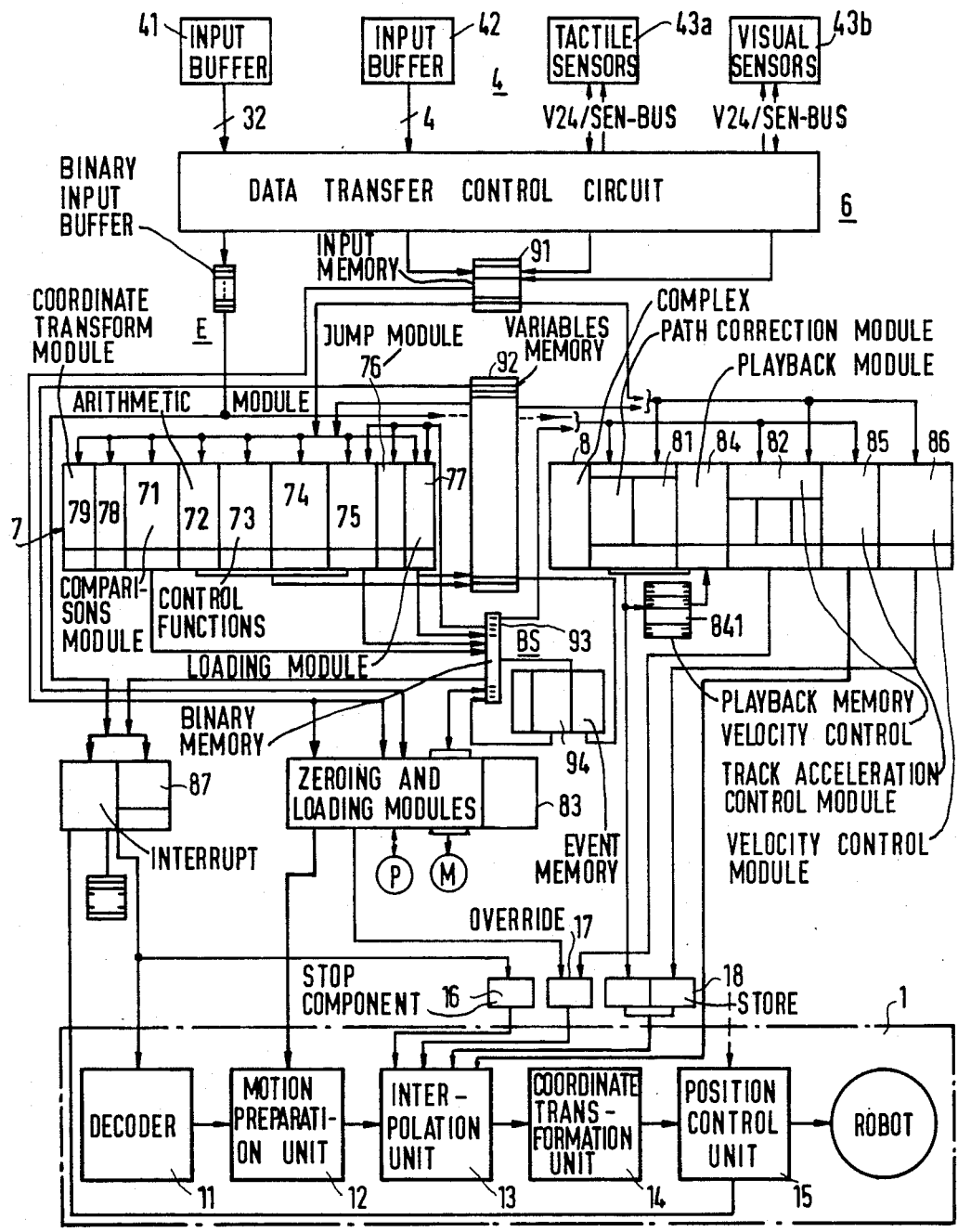
FIG. 10 is a block diagram of another embodiment of the sensor data preprocessing unit of FIG. 1, in accordance with the present invention.

As illustrated in FIG. 1, a basic motion controller 1 for a robot 2 comprises a decoder 11 which converts user commands into signals utilizable by the machine, a motion preparation unit 12, an interpolation unit 13 which calculates from predetermined end values of velocity, position and possibly acceleration the intermediate values according to given functions, a circuit 14 for transforming coordinates, for instance, from Cartesian to polar coordinates, and a position control module 15 with measuring systems for controlling and guiding the rotational and translational motion of the robot 2 along predetermined paths with predetermined velocities. The position control module 15 may also guide orientations and positions of different moving members of a complex robot. The robot 2 itself executes a work process 3, such as a deburring operation, or the laying down of a weld or the assembly of workpieces. During the working process, sensors generate signals relating to position, forces, etc., which signals are transmitted back to motion controller 1 as digital, analog or binary signals via a sensor interface 4. For adapting even the most diverse sensors to a wide range of technological problems, there is provided between the sensor interface 4 and the motion controller 1 a sensor data preprocessing unit 5 with the access points A1 through A4, which unit is of modular design, as shown in FIGS. 2, 9 and 10.

Figure 2:
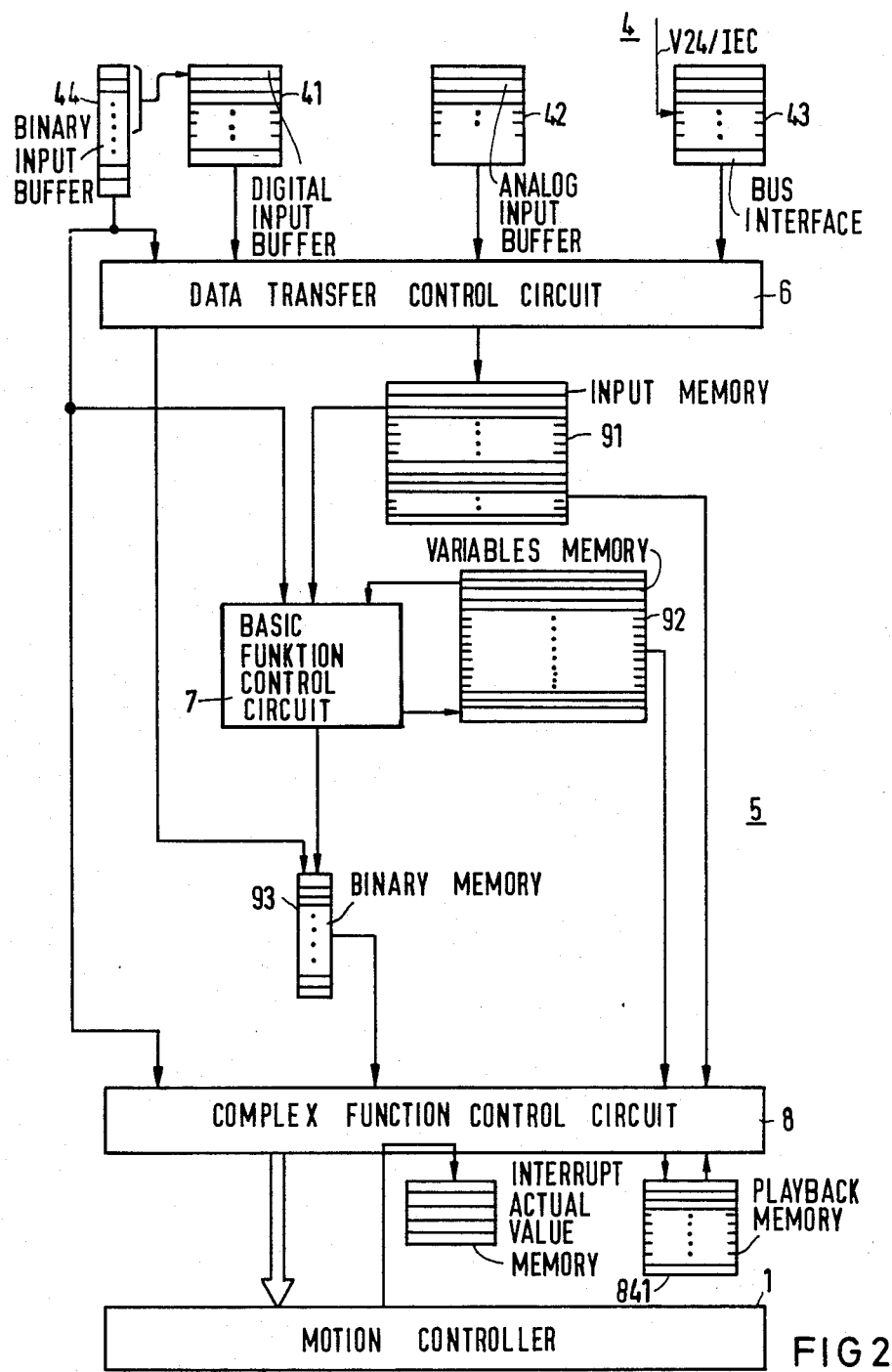
FIG. 2 is a block diagram illustrating in part the memory structure of the sensor data preprocessing unit and showing a data transfer control circuit included therein.

As illustrated in FIG. 2, interface 4 has a first input buffer 41 for receiving signals from digital sensors, a second input buffer 42 for receiving signals from analog sensors, special interfaces 43 provided for bus systems, and another input buffer for receiving specifically binary signals 44. These inputs (input buffers) 41 through 44 are connected to a data transfer control circuit 6. This circuit 6 has the purpose of assuming for higher sensors which are connected via the input buffer 43 the data request, the data channel selection, the data processing and the ready state of the data. In addition, data transfer control circuit 6 operates the interface programmably upon request or cyclically. The data transfer control circuit 6 advantageously converts analog input signals from buffer 42 into digital values, the resulting selected data being processed and stored in an input memory 91. Generally, the same input procedures apply to digital input signals from buffer 41.

The data transfer control circuit 6 is started with the required initialization parameters being either generated internally by the system or fed thereto by separate program commands, and then operates the interface upon request or cyclically in the interpolation rhythm and performs all the special interface functions required. By incorporating this interface control function into the overall system (and specifically into the data preprocessing unit 5) it is assured that following sensor functions can always fall back selectably in the input memory to the current (current, for instance, from the last interpolation cycle) data.

Upon the storage of data in input memory 91, the basic function control circuit 7 is called into service, e.g. by a control module 73 (FIG. 10) monitoring the contents of memory 91, to perform the next function. This control circuit 7, which is subdivided into modular building blocks, makes it possible to process data arithmetically or logically, to filter analog input signals several bits wide, to interrogate limits or to make comparisons, to form averages or to execute control functions, for instance, P, I or PI behavior, where the mode of operation is cyclic in the interpolation rhythm. Module 7 also has access to a variable memory 92 and a binary memory 93. The results of preliminary or basic processing performed by module 7 are transferred into these memories 92 and 93. The complex function control circuit 8 has access to the latter, as well as to the input memory 91. This complex function control circuit implements a velocity control or a track correction via motion controller 1, as described in detail hereinafter with reference to FIGS. 9 and 10.

Figure 3:
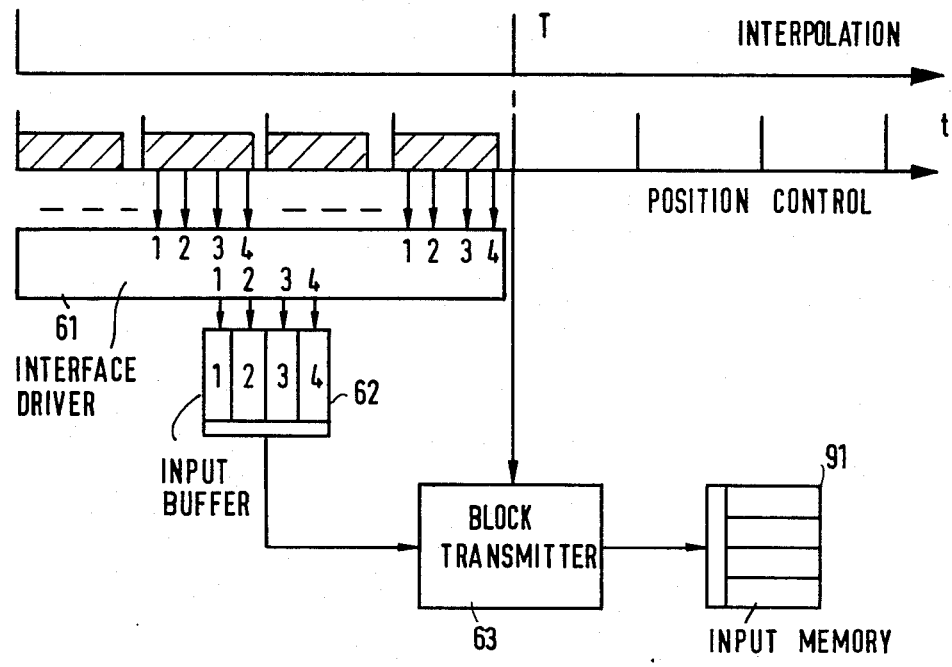
FIG. 3 is a combined block diagram and time graph showing the cycle of the data transfer for an analog module in the data transfer control circuit of FIG. 2.

FIG. 3 in part schematically illustrates the data transfer function for analog signals arriving via input buffer 42. As shown in FIG. 3, the module of circuit 6 performing the analog data transfer consists essentially of an interface driver 61, an input buffer 62, and a block transmitter 63. The interface driver 61 operates in synchronization with the position control module 15 of controller 1 (see FIG. 9), whereby idle time between the analog and digital conversion and the trigger and data reading process is eliminated. The interface driver describes in each position control cycle the input buffer 62. The block transmitter 63 operates at the interpolation frequency immediately after the pulse T as the first function and transfers the data from the input buffer 62 into the input memory 91. The module of FIG. 3 is but one of the modules of data transfer control circuit 6. Further modules are provided for higher-order sensors, which are operated via a serial or a parallel interface; in particular, the sensor-data control instructions, the sensor data read instructions, and the sensor data requests must be generated by this interface and transmitted toward the higher-order sensors. The sensor-data control instructions include control commands transmitted to the sensor. The contents of these commands or transfer protocols can either be programmed in the user command or deposited in user tables. Such deposited protocols serve, on the one hand, to control the interface itself with the necessary control commands and, on the other hand, to transmit the commands proper to the sensor. The sensor data read instructions determine which sensor data, furnished continuously by the sensor are read into the data preprocessing unit 5. The reading can be done either continuously or discontinuously. The read function of the higher-order sensor module of data transfer circuit 6 is performed by an interface driver and a block transfer or transmitter, the interface driver operating either cyclically or in an interrupt mode.

The basic function control circuit 7 (FIG. 2) has modules for performing logical and arithmetic operations, for implementing control and filtering functions, for making comparisons and for executing nonlinear mathematical operations.

The arithmetic function modules undertake elementary mathematical operations such as addition, subtraction, division, multiplication and inversion. Both the arithmetic and logical function modules can operate cyclically, preferably with the cadence of the interpolation operation, on analog or digital signals and on variable or constant values, the results being stored automatically.

In the control and filtering modules of basic function control circuit 7 both analog and digital input signals can be processed.

A mean value can be formed via a suitable filter algorithm operating on several sampling values of an input signal, the mean value being written into a predetermined location in the sensor data memory. A control function, for instance, for a P-controller, is formed by taking as the starting value the difference between two input values, multiplied by a gain factor. The I- and PI-control functions are carried out similarly.

The nonlinear function modules of the basic function control circuit 7 compute absolute values, implement diode functions, perform limiting operations, or calculate particular values of higher mathematical functions such as sine, cosine and e-functions.

Forming comparisons is an additional capability of one or more modules of basic function control circuit 7 and enables the monitoring of an analog signal or a multibit digital signal for two programmable limits, where the result is then a logical binary signal. Alternatively, two or more analog or multibit digital signals can be each compared with two respective programmable limits and a logical interlinkage of the individual comparison results can be formed to produce a binary logic signal. The comparison module 71 (see FIGS. 9 and 10) in circuit 7 compares two operands with each other to furnish a binary comparison result. The desired comparator function is started with the necessary parameters by programming predetermined by the user and then runs cyclically in the interpolation rhythm until it is terminated by a command. The input data are read by the input memory 91 or the variables memory 92. The logical interlinkage result is written into the programmable binary memory 92 (FIG. 2).

At least one module of basic function control circuit 7 performs an essential storage and counter function. Specifically, that module determines whether a preselected binary signal has occurred at least once in an observation period or counts how many times the signal has been generated in the period. In response to this information, for instance, program branchings can be initiated (event memory 4 in FIGS. 9 and 10).

Figure 4:
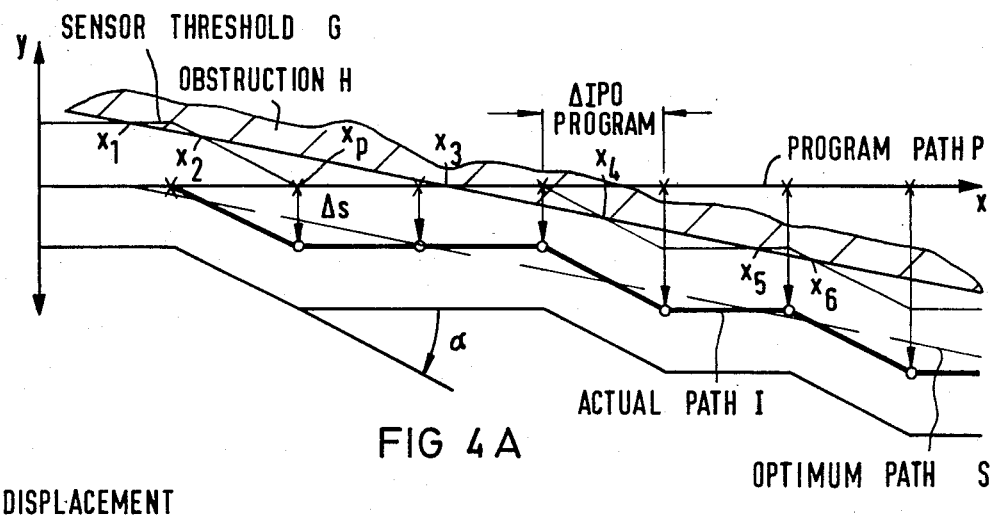
FIG. 4A is a graph showing an actual path taken by a robot, having a data preprocessing unit according to the present invention, confronted with an elongated obstruction across a programmed path.
FIG. 4B is a graph showing displacements of the robot transverse to the program path of FIG. 4A as a function of position parallel to that path.
FIG. 4C is a graph showing the voltage level of a proximity signal as a function of the robot's progress parallel to the program path of FIG. 4A.
Figure 4:
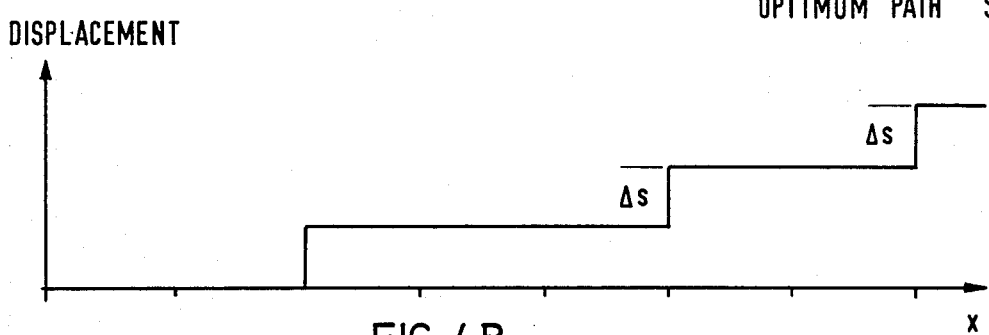
Figure 4:
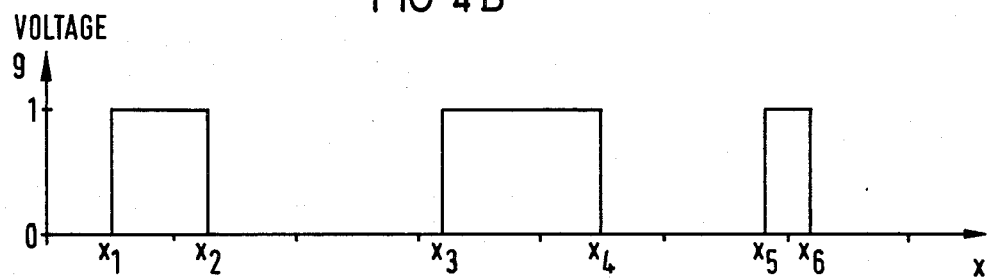

Besides the data transfer functions and the basic functions described above, other functions which are essential primarily for data processing are the complex functions. One such function entails the execution of track or path corrections for the robot or a separately moving part thereof. The starting point of all track motions is the programmed path P (see FIG. 4A), or in abbreviated form, the program path. Such a path represents, for example, a line along which a weld seam is to be formed between a pair of metal plates by a welding robot (see FIGS. 14A and 15) or a line along which an incision is to be made in an preformed metal or synthetic resin part by a cutting torch or metal tool. If the part on which the robot is to operate has not been accurately positioned in the robot's work area or if the part has deviations in shape represented by an obstruction H extending across the program path P in FIG. 4A, the optimum solution is to have the robot 2 (FIG. 1) trace a desired path S (see FIG. 4A) which extends parallel to the obstruction H. A sensor-controlled path monitoring function included in a robot controller according to the present invention approximates the optimum path S by generating path corrections s (see FIGS. 4A and 4B) such that the actual path I the robot takes does not deviate by more than a preestablished residual error from the optimum path S. It is assumed here that the program starting point is the desired starting point. As illustrated in FIG. 4A, portions of the actual path I are rotated relative to the program path P by a correction angle $\alpha$. A maximum intercept range for the robot, i.e., a region in which the residual error can be guaranteed to be no greater than a threshold value, can be defined from sensor-controlled path correction by a maximum correction angle $\alpha_{max}$. Possible path corrections for a program path P lying in a horizontal plane include a normal correction taken in the horizontal plane perpendicularly to the program path, a binormal correction taken in a vertical plane perpendicularly to the program path, and a tangential correction taken along the program path. Thus, with reference to FIG. 14A, the normal correction can be used to accommodate variations in the edge of a piece along which a weld is to be formed, while the binormal correction can be used to compensate differences in tool lengths and the tangential correction to vary track velocities and overall path length. Since the definition of the sensor correction directions is based on the relative position of the tool and the track, the orientation of the tool at the operating point, as well as the direction of motion, is of importance for the unambiguous determination of the sensor-controlled path corrections. The desired direction of the correction can be preselected by the user when the control program with the parameter input is entered.

The track following function implemented by means of a digital three-point or a tri-directional sensor will now be described in greater detail, reference being made to FIGS. 4A-4C. These figures correspond to a right-left or normal path correction.

It is assumed in FIG. 4A that the program trajectory or path P is preset in the x-direction. The obstruction H lying across the robot's programmed trajectory P is sensed by a three-point sensor included in the digital sensors 41. If a sensor threshold G is exceeded, i.e., if the robot approaches the obstruction to within a preset distance, a signal g is generated and remains present as long as this limit remains exceeded. As shown in FIGS. 4A nd 4C, path correction signal g is present when the robot or moving part thereof has an x coordinate between $x_1$ and $x_2$, $x_3$ and $x_4$, or $x_5$ and $x_6$. At each of these x coordinate intervals, the program path P is corrected by a constant increment $\Delta s$, this correction value $\Delta s$ being already taken into consideration at the first correction (i.e., at interval $x_1 - x_2$) for interpolation at the path point $x_p$. The actual path I is thereby obtained. Since the sensor has ceased to detect the obstruction H when the robot has passed points $x_2$, $x_4$ and $x_6$, no further correction is made until the obstruction is sensed again upon the robot's passing points $x_3$ and $x_5$. The correction $\Delta s$ is made for each interpolation step. An overall actual path I is thereby obtained which deviates only relatively slightly from the ideal or optimum path S necessitated by obstruction H. Instead of a digital three-point sensor, an analog sensor can be used.

Figure 5:
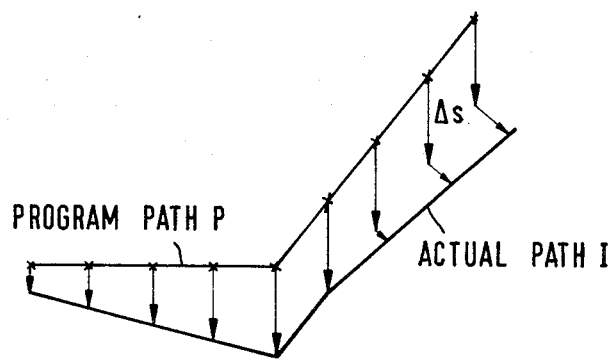
FIG. 5 is a diagram showing an actual robot path whose deviation from a program path is a result of vectorially combined path corrections.

As shown in FIG. 5, the corrections are advantageously not added arithmetically, but always in Cartesian coordinates, i.e., the overall sensor correction is the vector sum of all individual corrections. Thus, there are no velocity jumps at path corners.

By means of a playback or path repeat function according to the present invention, it is possible to make one or more track runs which repeat a run done once with active sensor path corrections, the repeat runs being accomplished without active sensor data correction, but taking the track-specific correction values of the first run into consideration. Such a playback function finds use in arc welding, for instance, of V-welds in multilayer technology.

Figure 6:
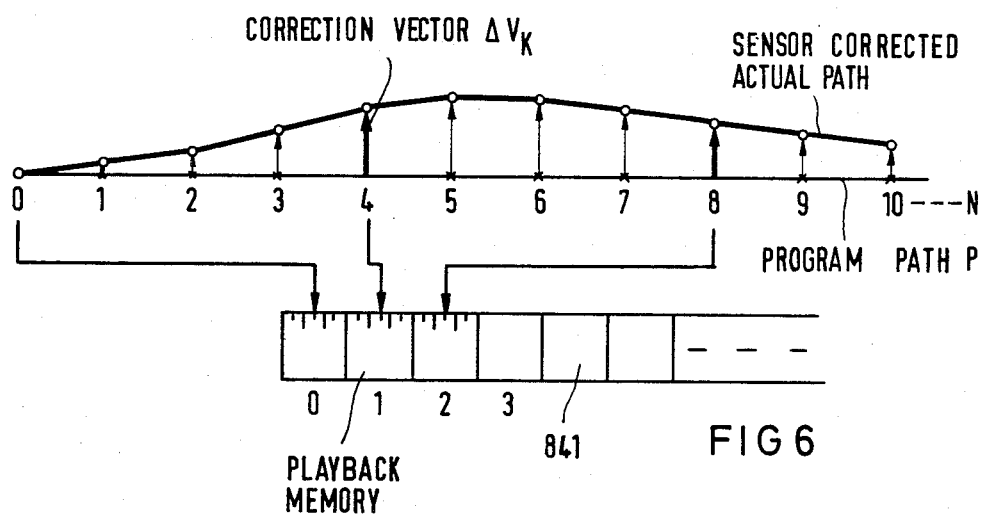
FIG. 6 is a diagram of a robot path corrected in response to sensor signals, showing correction vectors

To implement the playback function, sensor correction vectors $\Delta v_K$ (FIG. 6) are stored in a playback memory 841 (FIGS. 2, 6 and 10), activated as a function of the travel of the robot during the first run along the program path. To reduce the quantity of data, a correction vector is not stored in every interpolation cycle N, but, for instance, only in every fourth interpolation cycle. When the robot is moved again along the path, the interpolation is made between these correction values (FIG. 6).

Figure 7A:
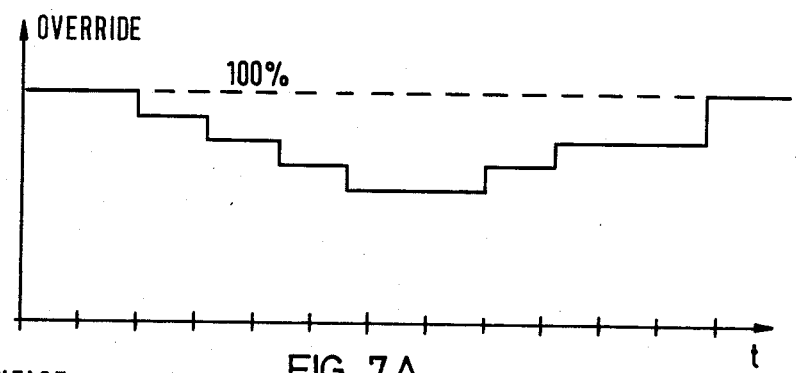
FIG. 7A is a graph of a robot velocity component as a function of time.
Figure 7B:
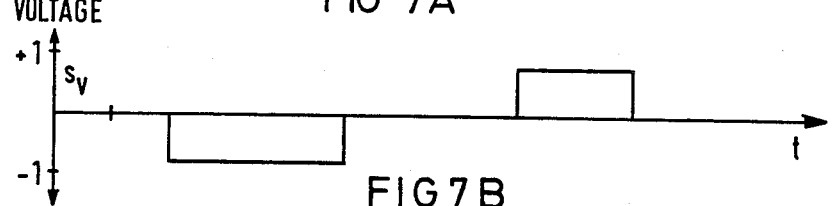
FIG. 7B is a graph of a velocity modification signal controlling the changes in the velocity component of FIG. 7A.

Besides the path correction function, another essential complex function is the control of track velocity (see FIG. 7A). In response to a signal $s_v$ (see FIG. 7B) from a digital three-point sensor sampling the velocity, the effective velocity (override) is changed in staircase fashion in the rhythm of the interpolation T. A positive sensor signal $s_v$ means a decrease and a negative sensor signal $-s_v$ an increase of the velocity. A similar situation applies to other sensor types.

Figure 8A:
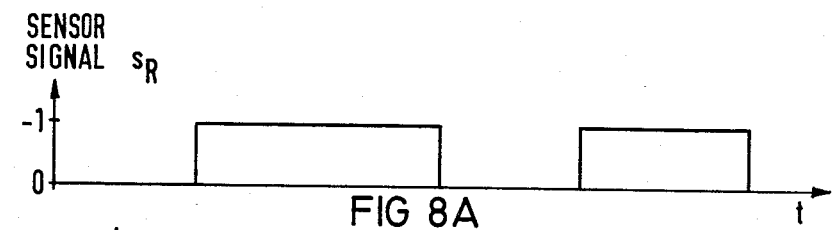
FIG. 8A is a graph of a robot sensor output signal as a function of time.
Figure 8B:
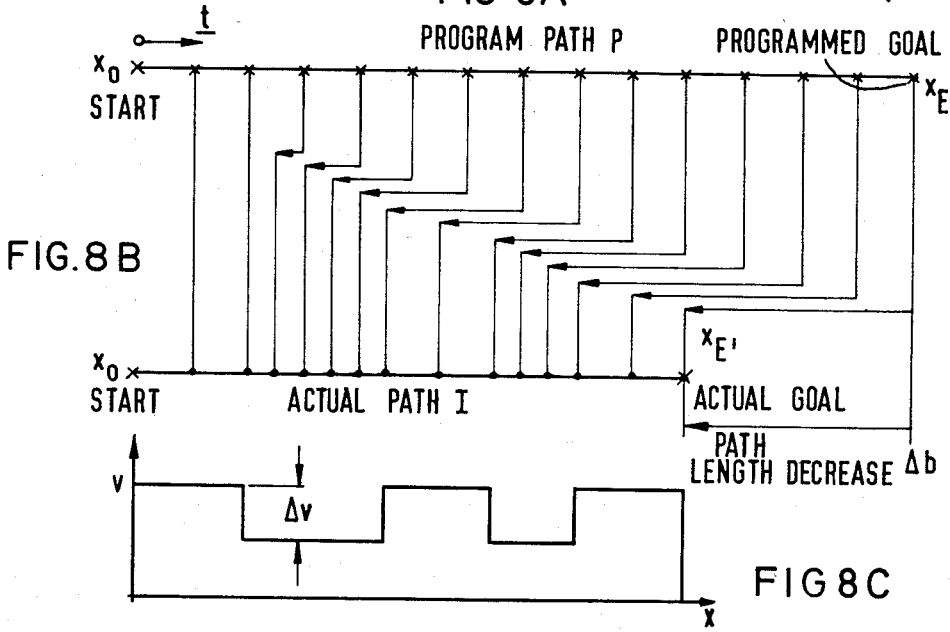
FIG. 8B is a pair of interconnected graphs showing robot position on a program path at equispaced time intervals, with and without velocity modification in response to the signal of FIG. 8A.
Figure 8C:
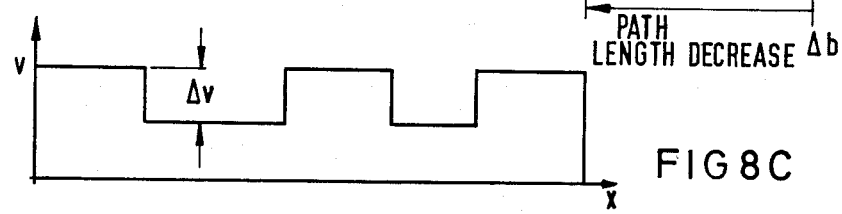
FIG. 8C is a graph of robot velocity as a function of position along the path shown in FIG. 8B.

Another complex function is path velocity control with path length correction. This function entails a simultaneous track velocity reduction and a shortening of the path relative to the program path in response to sensor generated signals. If it is assumed, for instance, in FIGS. 8A-8C that the program track P extends from an initial point $x_0$ to an end point $x_e$ and that a two-point sensor delivers signals $-s_R$ signifying a velocity reduction, an actual path I is obtained owing to a reduction of the robot velocity v by an amount $\Delta v$ caused by the sensor signal which actual path I extends a distance between the start $x_o$ and the actual goal $x_E'$ which is shorter than the program path P by distance $\Delta b$, the originally programmed distance not being traveled in the available time owing to the velocity reduction.

FIG. 9 shows a basic design of the robot motion control system and, in particular, data preprocessing unit 5, according to the present invention, including input memory 91, variable memory 92, binary memory 93 and event memory 94. Data transfer control circuit 6 is illustrated in FIG. 9, as well as a comparator module 71 of basic function control circuit 7 and separate tactile and visual sensors 43a and 43b. Included in the complex function control circuit 8 are a path correction module 81 and a path velocity control module 82. Further modules 83 are provided for executing one-time functions such as zero correction and loading. Path correction module 81 acts on the interpolation unit 13 via a storage member 18 to change the interpolation steps undertaken by unit 13. The track velocity control module 82 acts via an override 17 likewise on the interpolation unit 13, specifically to change the velocity. An interrupt module 87, which is activated in response to the sensors, can stop the interpolation process via a stop member or disabling component 16 and initiate program branching, etc., via decoder 11.

FIG. 10 shows an expanded embodiment of a sensor data preprocessing unit 5 in accordance with the present invention. The basic function control circuit 7 further comprises an arithmetic function module 72, a control module 73, a nonlinear characteristic module 74, a logical linkages module 75, jump and loading modules 76 and 77, respectively, a module 78 for forming average values and detecting extrema, and a coordinate transformation module 79. The complex function control circuit 8 further includes a playback module 84, a track acceleration control module 85 and one or more modules 86 for controlling the positions, orientations and velocities of respective robot appendages.

Figure 11:
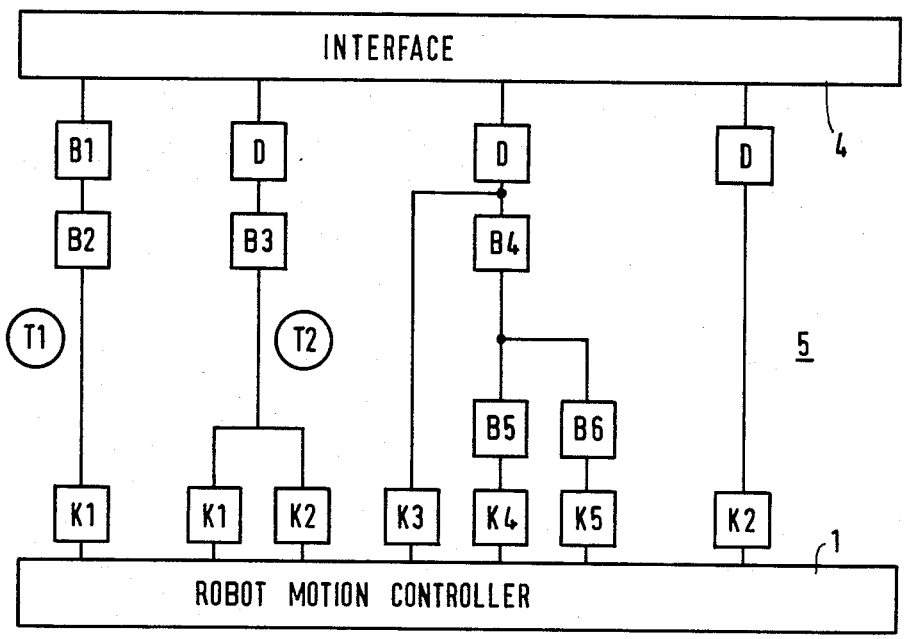
FIG. 11 is partially a block diagram and partially a flowchart, showing how the modular design of the present invention enables the execution of selected functions in sequences appropriate to the tasks being performed by the robot.

As illustrated in FIG. 11, only those modules D, B and K (generically designated) of the data preprocessing unit 5 are called up between the sensor interface 4 and the controller 1 which are necessary to solve the technological problem at hand. Thus, particular basic functions B1 and B2 and a complex function K1 are necessary for solving the technological problem T1, while the data transfer function D, the simple function B3 and, in parallel, two complex functions K1 and K2 are required for solving problem T2. The same applies logically to the other examples shown in FIG. 11. In this manner, the most varied sensors can be connected to the controller 1 for solving the most different technological problems in such a manner that optimum matching is obtained each time.

Figure 12:
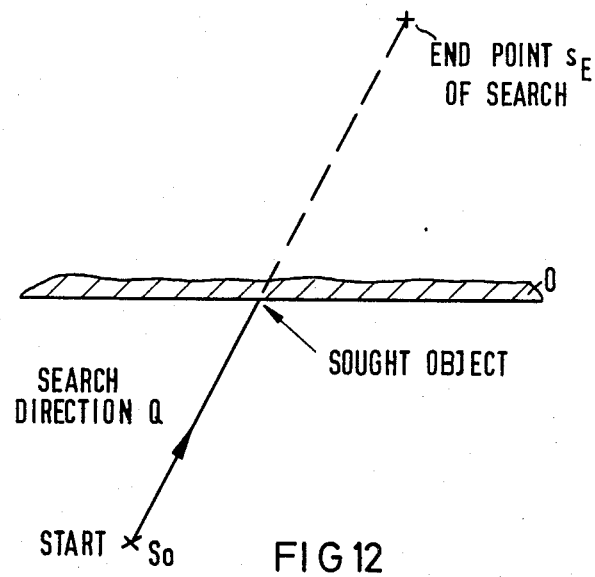
FIG. 12 is a diagram illustrating the robot task of locating an edge or object.

FIG. 12 shows a specific technical problem to be solved, namely, the finding of an edge or an object 0. From the starting point So, the robot travels in a predetermined search direction Q toward the object sought. When this edge is reached, the sensor generates a binary or analog output signal, depending on the type of sensor. If the object 0 has not been found by the time the robot reaches a predetermined search endpoint $s_E$, as indicated by a dashed line, a "not found" message is delivered. For solving this technical function or problem, therefore, only a simple function is needed, namely, "limit reached" or not.

Figure 13:
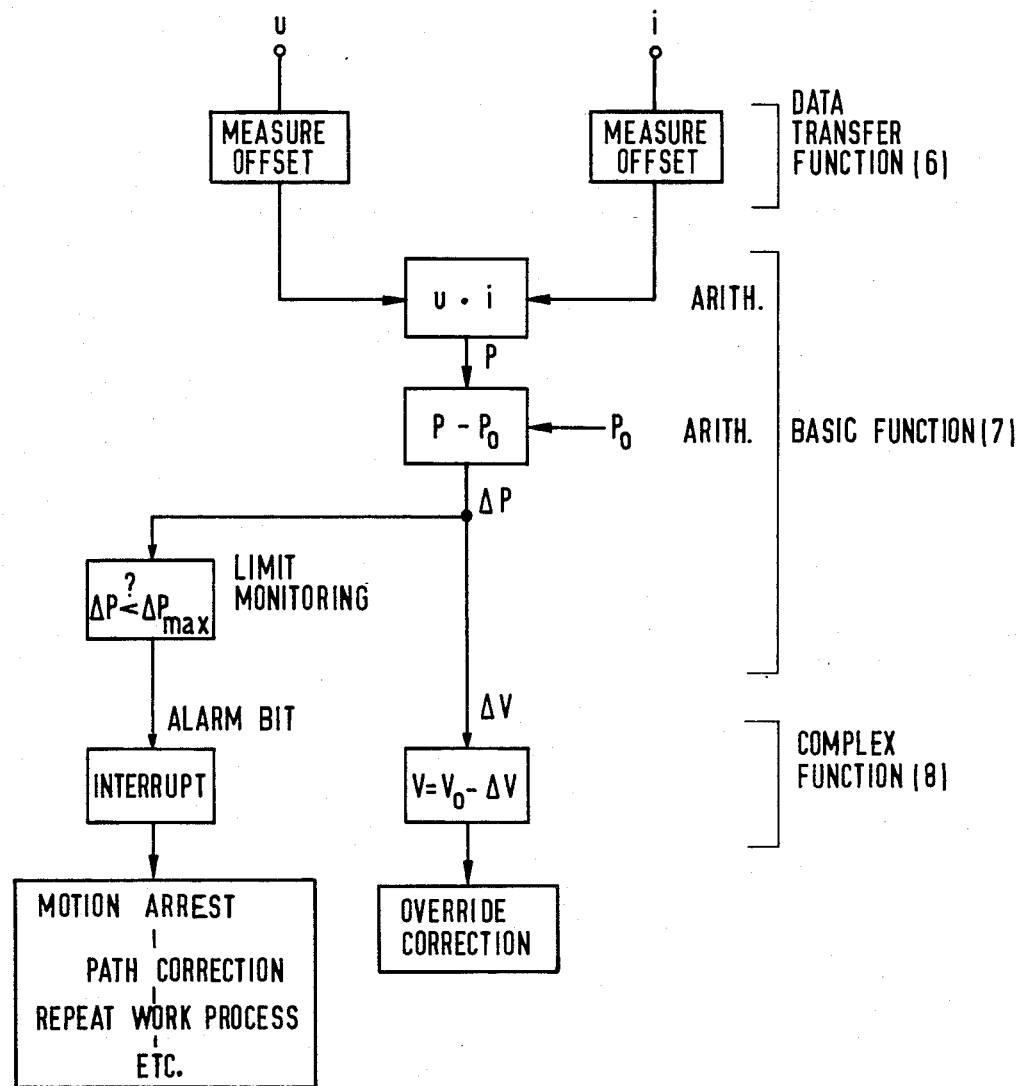
FIG. 13 is a flowchart-type diagram, showing operations performed by different circuits of the data processing unit of FIGS. 1, 2, 9 and 10 during a deburring of weld seams by the robot of FIGS. 1, 9 and 10.

FIG. 13 shows operations performed by different circuits of data preprocessing unit 5 during a deburring of weld seams by a robot. The operations include velocity alteration and limit monitoring. Here, the basic function control circuit 7 and the complex function control circuit 8 are needed for solving the technological function besides the data transfer function 6, by which the zero shift and data acquisition are performed. In the case of the basic functions, the arithmetic module 72 (see FIG. 10) performing multiplication operation is called up first to form the power P from the voltage u and the current i. Next, another arithmetic function is required to determine the difference between a pre-established $P_o$ and the actual value P. The resulting difference $\Delta P$ is monitored in relation to a limit $\Delta P_{max}$ and, if necessary, normalized and interlinked nonlinearly. If it is found that the limit $\Delta P_{max}$ is exceeded, interrupt module 87 is activated immediately via an alarm bit which initiates suitable countermeasures, for instance, the calling up of another program part via decoder 11. In addition, depending on $\Delta P$, the present velocity $v_o$ is reduced by a value $\Delta v$ by the velocity control module 82, and specifically, as an override correction, so that the velocity v is obtained.

Figure 14:
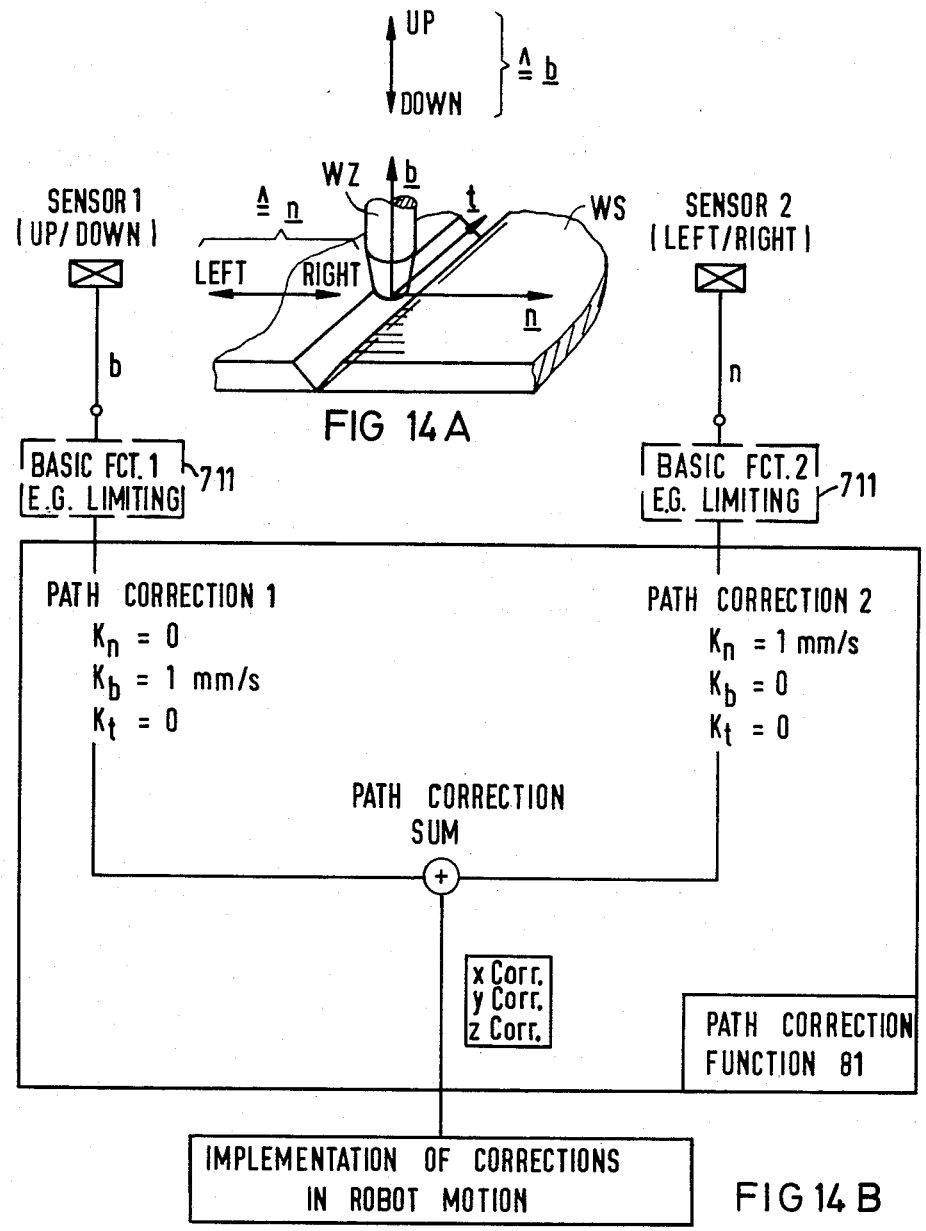
FIG. 14A is a perspective view of a robot-controlled welding tool capable of tridirectional motion monitored by a three point sensor.
FIG. 14B is a flowchart-type diagram with two branches, showing sequences of position correction functions for horizontal corrections and vertical corrections in the position of the welding tool of FIG. 14A.

FIG. 14 shows the following of a welded seam with two sensor signals, one for the normal or left-right correction direction n and one for the binormal or up-down correction direction b. To both sensor signals n and b is first assigned a basic function, for instance, "limitation" 711. The path correction module 81 in the complex function control circuit 8 forms correction values corresponding to the selected directions from the two sensor signals according to predetermined criteria. The path correction sum is then used for calculating the correction data and for accordingly altering the processes taking place in interpolation unit 13.

Figure 15:
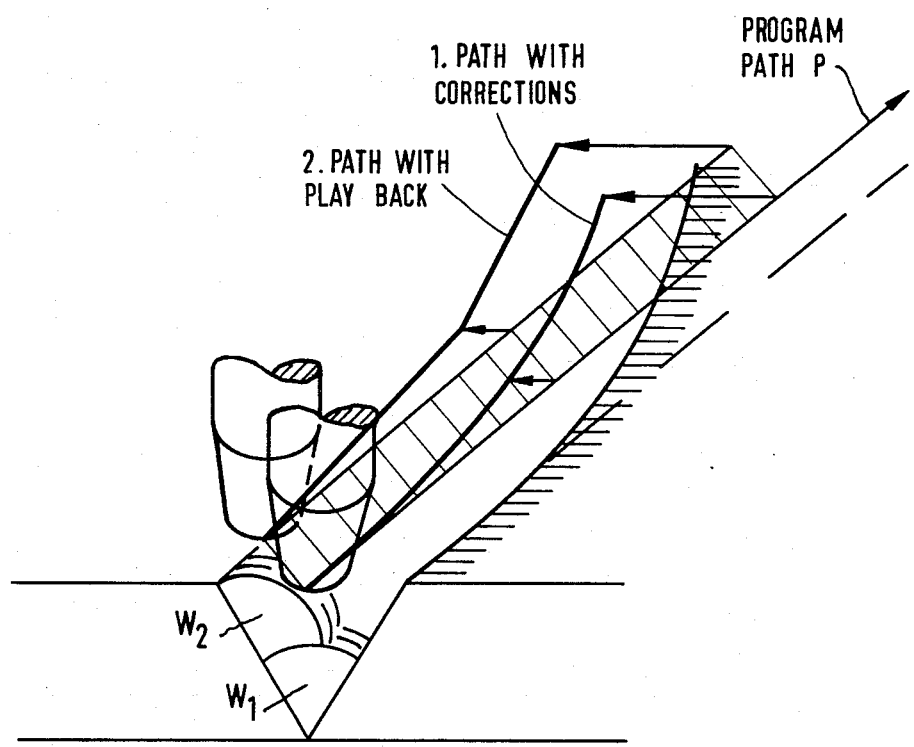
FIG. 15 is a schematic diagram of a multilayer weld, showing paths of an underlying and an overlying weld laid with playback in accordance with the present invention.

FIG. 15 shows multilayer welding with playback correction according to the present invention. Specifically, a first or root seam $w_1$ is laid along a predetermined program path P corrected in response to sensor signals, the corrected path being coded and stored in playback memory 841. The top seams W2 are then laid in according with the playback information modified by linear interpolation.

What is claimed is:

1. In a motion control system for a robot, said system comprising:
    interface means operatively connected to sensors for receiving and relaying signals from said sensors;
    position control means, including an interpolation unit, linked to the robot for controlling the motion of said robot along a predetermined path; and
    separate data preprocessing means tied between said interface means and said position control means for feeding signals to said position control means upon processing sensor signals received from said interface means, the improvement wherein said data preprocessing means includes:
    first memory means for storing incoming sensor generated data;
    second memory means for storing results of preprocessing operations;
    data transfer control means servicing the interface means and operatively linked to said first memory means for transferring sensor generated data to said first memory means from said interface means;
    basic function control means, including a comparison module, operatively connected to said first memory means for performing elementary operations, including comparisons, on sensor generated data from said first memory means, said basic function control means being operatively coupled to said second memory means for storing results of said elementary operations in said second memory means; and
    complex function control means, including a velocity correction module and a path correction module, operatively connected to said second memory means and to the interpolation unit of the position control means for executing velocity corrections and path corrections for the robot in at least two mutually independent directions by intervening in the operations of said interpolation unit at least partially in accordance with preprocessed data stored in said second memory means by said basic function control means, each of said control means including a plurality of independently functioning modules for performing respective mathematical operations related to robot control, said modules being activated in a temporal sequence predetermined at least in part by a technological task to be performed by said robot.

2. The improvement defined in claim 1 wherein said complex function control means is operatively connected to said first memory means, thereby enabling the performance of complex operations directly in response to incoming sensor data.

3. The improvement defined in claim 1 wherein said interpolation unit operates at an interpolation frequency and said data transfer control means operates cyclically at the same frequency.

4. The improvement defined in claim 1 wherein said data transfer control means operates upon request.

5. The improvement defined in claim 1 wherein said complex function control means includes a playback module for causing the robot to repeat a prior performed motion.

6. The improvement defined in claim 5 wherein said complex function control means further includes a track acceleration module for controlling acceleration of the robot.

7. The improvement defined in claim 1 wherein said complex function control means includes a track acceleration module for controlling acceleration of the robot.

8. The improvement defined in claim 1 wherein said basic function control means includes an arithmetic module for executing elementary arithmetic operations on received sensor data and a logic module for performing logic operations on received sensor data.

9. The improvement defined in claim 8 wherein said basic function control means further includes a control module at least in part for determining activation times for the modules of said basic function control means.

10. The improvement defined in claim 8 wherein said basic function control means further includes a nonlinear function module for executing nonlinear operations on sensor data.

11. The improvement defined in claim 8 wherein said basic function control means includes an additional module for computing mean values of sequences of incoming sensor data representing alternatingly increasing and decreasing values of a plurality of control parameters and for detecting extremum values of the data in such sequences.

12. The improvement defined in claim 8 wherein said basic function control means includes an additional module for performing transformations of sensor coordinates.

13. The improvement defined in claim 1 wherein said data transfer control means has an analog input module comprising an interface driver, an input buffer and a block transfer component, said interface driver being operatively connected to said interface means and to said input buffer for feeding data thereto from said interface means during every operating cycle of said position control means, said block transfer component being connected to an input to said input buffer and at an output to said first memory means for transferring data thereto from said input buffer.

14. The improvement defined in claim 1 wherein one of said basic function control means and said complex function control means includes a module for initiating interruptions in the processing operations of said data preprocessing means.

15. The improvement defined in claim 1 wherein one of said basic function control means and said complex function control means includes a module for controlling jumps and program branchings in the processing operations of said data preprocessing means.

16. The improvement defined in claim 1 wherein one of said basic function control means and said complex function control means includes a module for changing program parameters.

* * * * *